(12) United States Patent
Tan

(10) Patent No.: US 9,569,807 B2
(45) Date of Patent: *Feb. 14, 2017

(54) MEMORY CARD FOR PROVIDING MENU ITEMS TO A REMOTE WIRELESS-ENABLED APPARATUS

(75) Inventor: Wayne Joon Yong Tan, Singapore (SG)

(73) Assignee: T-Data Systems (S) Pte Ltd., Singapore (SG)

( * ) Notice: Subject to any disclaimer, the term of this patent is extended or adjusted under 35 U.S.C. 154(b) by 34 days.

This patent is subject to a terminal disclaimer.

(21) Appl. No.: 13/582,349

(22) PCT Filed: Mar. 1, 2010

(86) PCT No.: PCT/SG2010/000069
§ 371 (c)(1),
(2), (4) Date: Aug. 31, 2012

(87) PCT Pub. No.: WO2011/108989
PCT Pub. Date: Sep. 9, 2011

(65) Prior Publication Data
US 2012/0327268 A1 Dec. 27, 2012

(51) Int. Cl.
H04N 5/232 (2006.01)
H04N 5/225 (2006.01)
(Continued)

(52) U.S. Cl.
CPC ............ *G06Q 90/00* (2013.01); *H04N 1/0044* (2013.01); *H04N 1/00137* (2013.01); *H04N 1/00148* (2013.01); *H04N 1/00244* (2013.01); *H04N 1/00347* (2013.01); *H04N 1/00411* (2013.01); *H04N 1/00424* (2013.01); *H04N 1/00461* (2013.01); *H04N 1/00464* (2013.01); *H04N 1/00493* (2013.01); *H04N 1/00973* (2013.01); *H04N 1/2112* (2013.01); *H04N 1/2158* (2013.01); *H04N 1/32128* (2013.01);
(Continued)

(58) Field of Classification Search
CPC ...... H04N 5/232; H04N 5/23206; H04N 5/76; H04N 1/32773; G06Q 90/00
USPC ........................................ 348/231.99, 207.1
See application file for complete search history.

(56) References Cited

U.S. PATENT DOCUMENTS 6,400,903 B1    6/2002  Conoval et al.
6,970,183 B1 *  11/2005 Monroe ................. G08B 7/062
                                                            348/143
(Continued)

FOREIGN PATENT DOCUMENTS

WO    2007035275    3/2007

*Primary Examiner* — Abdelaaziz Tissire
(74) *Attorney, Agent, or Firm* — Kramer Levin Naftalis & Frankel LLP

(57) ABSTRACT

A memory card (103) for use in an electronic apparatus (101) is proposed. In order to control an electronic apparatus (101) with an inbuilt processor (301) incapable of exporting digital data externally of the electronic apparatus (101), a user local at the electronic apparatus (101) is required to operate the electronic apparatus (101). This is not always convenient. The proposed memory card (103) has a wireless module (207) for receiving an instruction wirelessly from a remote wireless-enabled apparatus (105), and also a central processor (201) for controlling the inbuilt processor (301) of the electronic apparatus (101) in accordance with the received instruction.

25 Claims, 4 Drawing Sheets

(51) Int. Cl.
   *G06Q 90/00* (2006.01)
   *H04W 4/00* (2009.01)
   *H04N 1/327* (2006.01)
   *H04N 1/00* (2006.01)
   *H04N 1/21* (2006.01)
   *H04N 1/32* (2006.01)

(52) U.S. Cl.
   CPC ..... *H04N 1/32773* (2013.01); *H04N 1/32776* (2013.01); *H04N 5/232* (2013.01); *H04N 5/23206* (2013.01); *H04W 4/003* (2013.01); *H04N 5/225* (2013.01); *H04N 2201/0018* (2013.01); *H04N 2201/0036* (2013.01); *H04N 2201/0039* (2013.01); *H04N 2201/0055* (2013.01); *H04N 2201/0075* (2013.01); *H04N 2201/0084* (2013.01); *H04N 2201/0087* (2013.01); *H04N 2201/3253* (2013.01); *H04N 2201/3266* (2013.01); *H04N 2201/3274* (2013.01); *H04N 2201/3278* (2013.01)

(56) References Cited

U.S. PATENT DOCUMENTS

| | | | |
|---|---|---|---|
| 7,880,761 B2 | 2/2011 | Clark et al. | |
| 8,504,772 B2* | 8/2013 | Tan | G06K 19/0723 710/313 |
| 9,152,907 B2* | 10/2015 | Tan | G06K 19/0723 |
| 2002/0052219 A1* | 5/2002 | Hamamura | G06F 1/30 455/557 |
| 2002/0174337 A1* | 11/2002 | Aihara | G06F 21/78 713/172 |
| 2003/0079096 A1* | 4/2003 | Murakami | G06F 21/77 711/156 |
| 2003/0083048 A1* | 5/2003 | Robinson | H04N 5/232 455/412.1 |
| 2003/0128272 A1* | 7/2003 | Clough | H04N 1/00132 348/14.02 |
| 2003/0146977 A1* | 8/2003 | Vale | H04N 1/00204 348/207.1 |
| 2004/0127254 A1* | 7/2004 | Chang | G06F 9/44584 455/557 |
| 2004/0219949 A1* | 11/2004 | Su | G06F 21/85 455/558 |
| 2005/0156737 A1* | 7/2005 | Al-Khateeb | G08B 13/19602 340/541 |
| 2006/0039221 A1* | 2/2006 | Fukuda | H04N 1/00137 365/222 |
| 2006/0056326 A1* | 3/2006 | Croome | H04W 4/008 370/315 |
| 2006/0125867 A1* | 6/2006 | Sakuda | B41J 29/393 347/19 |
| 2006/0246840 A1* | 11/2006 | Borowski | G06K 7/10306 455/41.2 |
| 2007/0015589 A1* | 1/2007 | Shimizu | G06F 21/6245 463/43 |
| 2007/0030357 A1* | 2/2007 | Levien | G06T 1/0007 348/211.14 |
| 2007/0073937 A1* | 3/2007 | Feinberg | G06F 9/445 710/62 |
| 2007/0236327 A1 | 10/2007 | Miyashita et al. | |
| 2008/0117922 A1* | 5/2008 | Cockrell | H04L 12/66 370/401 |
| 2008/0195797 A1* | 8/2008 | Sherman | G06F 3/0605 711/103 |
| 2008/0252923 A1* | 10/2008 | Yoshigahara | H04N 21/4117 358/1.15 |
| 2009/0086041 A1 | 4/2009 | Choi et al. | |
| 2009/0128634 A1* | 5/2009 | Miura | H04N 5/765 348/207.1 |
| 2009/0298469 A1* | 12/2009 | Kim | H04M 1/72522 455/411 |
| 2010/0115200 A1* | 5/2010 | Papagrigoriou | G06F 3/0607 711/115 |
| 2010/0201845 A1* | 8/2010 | Feinberg | G06F 9/445 348/231.99 |
| 2011/0004840 A1* | 1/2011 | Feinberg | G06F 9/445 715/772 |
| 2011/0025858 A1* | 2/2011 | Elazar | G06Q 30/02 348/207.1 |
| 2011/0145464 A1* | 6/2011 | Tan | G06K 19/0723 710/301 |
| 2012/0162536 A1* | 6/2012 | Sibilsky | G06F 3/033 348/734 |
| 2012/0242845 A1* | 9/2012 | Tan | H04N 1/00413 348/207.1 |

* cited by examiner

MEMORY CARD FOR PROVIDING MENU ITEMS TO A REMOTE WIRELESS-ENABLED APPARATUS

CROSS REFERENCE TO RELATED APPLICATIONS

This application is the United States national phase filing of the corresponding international application number PCT/SG2010/000069, filed on Mar. 1, 2010, and published as WO 2011/108989 A1, which application is hereby incorporated herein by reference in its entirety.

FIELD OF THE INVENTION

This invention relates to a memory card for use in an electronic apparatus, and a method of controlling the electronic apparatus with the memory card, and relates particularly, though not exclusively, to a memory card for use in a digital camera and/or a digital video recorder, and a method of controlling the digital camera and/or a digital video recorder with the memory card by use of a remote wireless-enabled apparatus.

BACKGROUND OF THE INVENTION

In order to control an electronic device such as a digital camera and a digital video recorder, a user local to the electronic device is required for control. For example, the user is able to capture an image using a digital camera or to view images stored in the digital camera only if he is local at the digital camera.

This is not always convenient. For example, if the user of the digital camera wants to take a picture of himself, he may either have to request a third party to operate his digital camera or use a time delay function (if available) in the digital camera. If the time delay function is used, there is chance that the user is not adequately prepared for photo-taking which means that the photo is not well-taken.

This invention therefore proposes an improved memory card for use in an electronic apparatus, and also a method of controlling the electronic apparatus with the memory card, which at least reduces inconvenience.

SUMMARY OF THE INVENTION

In general terms, this invention proposes a memory card for use in an electronic apparatus, to control the electronic apparatus in accordance with an instruction wirelessly received from a remote wireless-enabled apparatus.

According to a first exemplary aspect there is provided a memory card for use in an electronic apparatus, the electronic apparatus having an inbuilt processor incapable of exporting digital data externally of the electronic apparatus, the memory card comprising:
  a wireless module; and
  a central processor configured to control the inbuilt processor of the electronic apparatus, in accordance with an instruction wirelessly received through the wireless module from a remote wireless-enabled apparatus.

According to another exemplary aspect there is provided a wireless-enabled apparatus for controlling a remote electronic apparatus having the memory card described above and an inbuilt processor that is incapable of independently exporting digital data externally of the remote electronic apparatus, the wireless-enabled apparatus being configured to wirelessly send an instruction to the remote electronic apparatus so as to control the remote electronic apparatus in accordance with the instruction.

According to a further exemplary aspect there is provided a method of controlling an electronic apparatus, the electronic apparatus having the memory card as described above and an inbuilt processor incapable of independently exporting digital data externally of the electronic apparatus, the method comprising the steps of:
  the memory card wirelessly receiving an instruction through the wireless module from a remote wireless-enabled apparatus, and
  the memory card controlling the electronic apparatus in accordance with the received instruction.

According to a final exemplary aspect there is provided an electronic apparatus comprising:
  the memory card described above; and
  an inbuilt processor incapable of independently exporting digital data externally of the electronic apparatus.

As the inbuilt processor is incapable of independently exporting digital data externally of that electronic apparatus, by providing a memory card with a central processor for controlling an inbuilt processor of an electronic apparatus based on the instructions wirelessly received from the remote wireless-enabled apparatus, remote control and operation of the electronic apparatus is possible. Advantageously, the proposed memory card improves the usage flexibility of the electronic apparatus.

Some optional features of the invention are defined' in the dependent claims.

For example, the central processor of the memory card may act on the received instruction to request from the inbuilt processor of the electronic apparatus a real-time view of an image sensor and to wirelessly transmit the real-time view onward to the remote wireless-enabled apparatus.

A user may therefore view the real-time view on the remote wireless-enabled apparatus before taking a picture of himself. Advantageously, this may assist in the picture being reasonably well-taken.

Furthermore, the memory card may be remotely controlled by the remote wireless-enabled apparatus to wirelessly transmit corresponding thumbnail versions of images stored in the memory card to the remote wireless-enabled apparatus for display. A user may then instruct the memory card to wirelessly send an image—corresponding to a thumbnail selected on the remote wireless-enabled apparatus—either directly to a remote electronic apparatus or indirectly through an access point to a predetermined website or server.

BRIEF DESCRIPTION OF THE DRAWINGS

Embodiments of this invention will now be described, by way of example only, of which:

FIG. 5, comprising

DETAILED DESCRIPTION OF THE EMBODIMENTS

Figure 1:
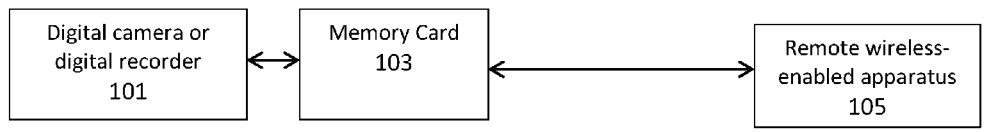
FIG. 1 shows a block diagram of a preferred embodiment of a memory card controllable by a remote wireless-enabled apparatus to instruct an electronic apparatus having the memory card.

FIG. 1 shows a block diagram of a memory card 103 operatively connected to an electronic apparatus 101. The electronic apparatus 101 may be a digital camera or a digital video recorder. Through the memory card 103, the electronic apparatus 101 can be wirelessly controlled by a remote wireless-enabled apparatus 105. The remote wireless-enabled apparatus 105 may be a telecommunication-enabled apparatus such as a mobile telephone or a car navigation system. Alternatively, it may be a laptop computer, notebook computer, PDA, digital diary, or the like. Specifically, the memory card 103 controls the electronic apparatus 101 in accordance with an instruction wirelessly received from the remote wireless-enabled apparatus 105. The wireless protocol used may be any suitable wireless protocol such as, for example, Bluetooth, and Wi-Fi. The only requirement is the both the memory card 103 and the remote wireless-enabled apparatus 105 use the same protocol.

Figure 2:
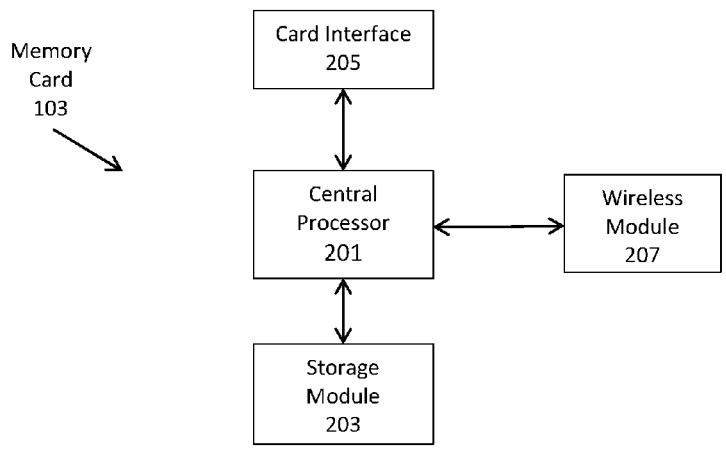
FIG. 2 shows a block diagram of the memory card of FIG. 1.

FIG. 2 shows a block diagram of the memory card 103, which has a central processor 201. The memory card 103 also has a storage module 203, a card interface 205, and a wireless module 207, all of which are operatively connected to the central processor 201. The wireless module 207 is configured with various wireless standards such as Wi-Fi, Bluetooth, or the like.

Figure 3:
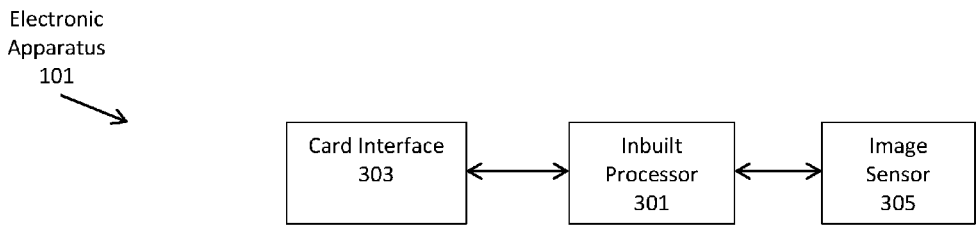
FIG. 3 shows a block diagram of the electronic apparatus of FIG. 1.

FIG. 3 shows a block diagram of the electronic apparatus 101, which has an inbuilt processor 301, an image sensor 305, and a card interface 303. The inbuilt processor 301 is incapable of independently exporting digital data externally of the electronic apparatus 101. By independently exporting, it is meant that the inbuilt processor 301 requires the electronic apparatus 101 to be operatively connected to an intelligent host such as a computer that has the relevant operative software to enable the export of the digital data to the computer from the electronic apparatus 101, whereby the exporting is performed under the control of the computer. The card interface 303 of the electronic apparatus 101 is for interfacing with the memory card 103 via the card interface 205 of the memory card 103. Whenever the memory card 103 is operatively connected to the electronic apparatus 101, the card interface 303 sees the memory card 103 as a normal memory card and will interface with it in the usual manner for transferring digital data from the inbuilt processor 301 to the storage module 203 of the memory card 103. For example, the inbuilt processor 301 receives an image captured by the image sensor 305 and immediately directs the captured image to the memory card 103 for storing in the storage module 203.

Figure 4:
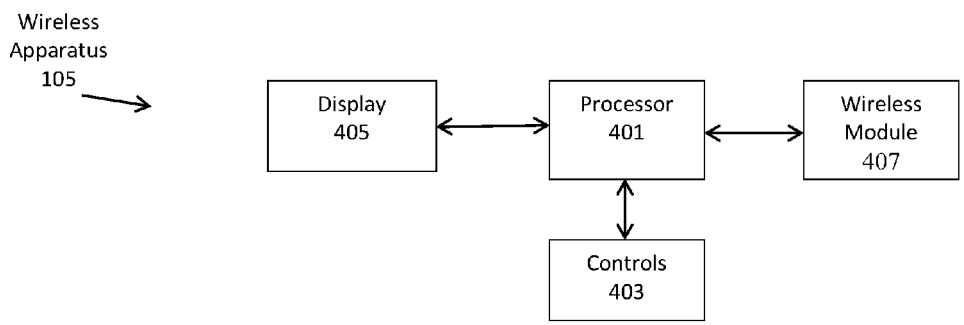
FIG. 4 shows a block diagram of the remote wireless-enabled apparatus of FIG. 1.
Figure 5A:
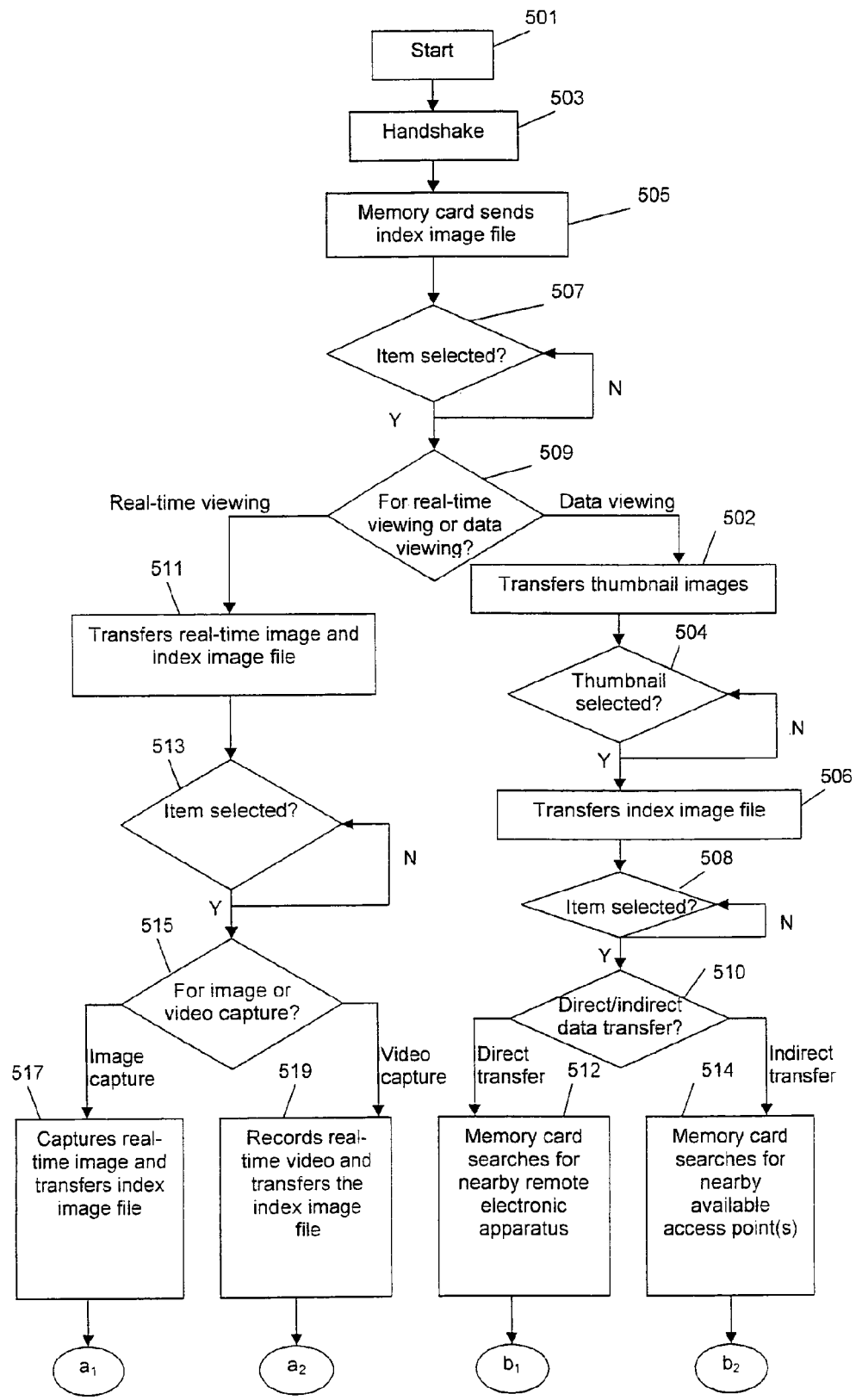
FIGS. 5a to 5c, is a flow chart of the operation of the apparatus of FIGS. 1 to 4.
Figure 5B:
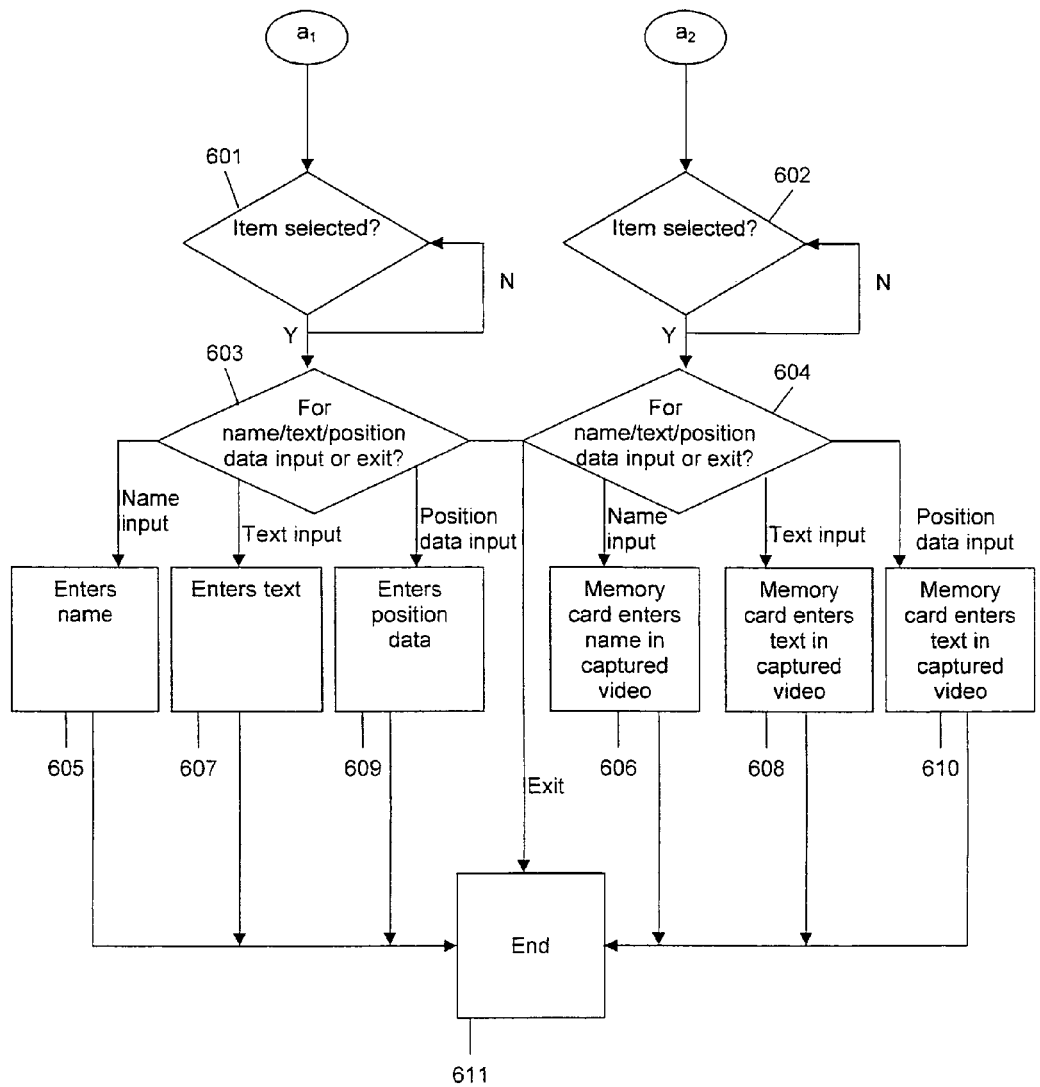
Figure 5C:
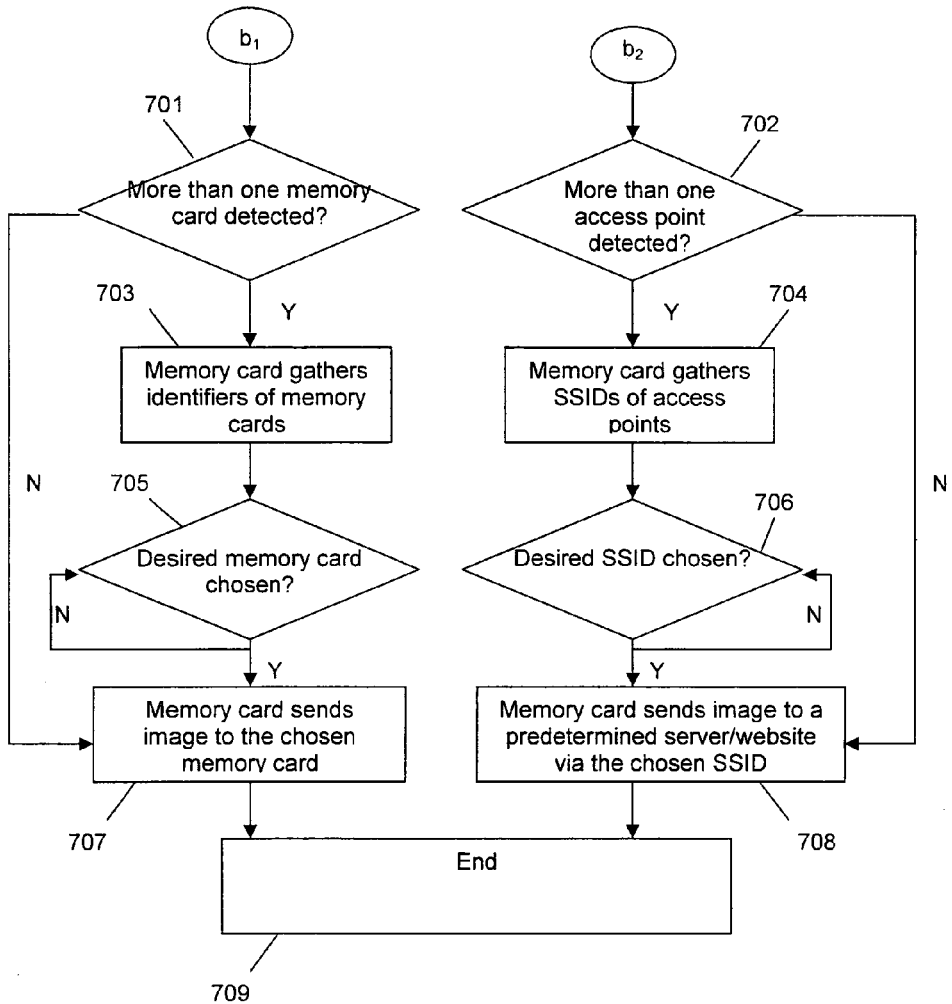

FIG. 4 shows a block diagram of the remote wireless-enabled apparatus 105, which has a processor 401, controls 403 such as a keypad or a touch screen, a display 405, and a wireless module 407. Like the memory card 103, the wireless module 407 of the remote wireless-enabled apparatus 105 is operable with various wireless standards such as Wi-Fi, Bluetooth, or the like.

The remote wireless-enabled apparatus 105 initiates 501 a connection with the memory card 103 through the controls 403, which triggers a handshaking procedure 503 such that the remote wireless-enabled apparatus 105 wirelessly and directly detects and connects to the memory card 103. Once the connection between the respective wireless modules 207, 407 of the memory card 103 and the remote wireless-enabled apparatus 105 is established, the central processor 201 of the memory card 103 instructs 505 the wireless module 207 to send an index image file from the memory card 103 to the remote wireless-enabled apparatus 105 through the wireless module 407. Accordingly, the processor 401 of the remote wireless-enabled apparatus 105 receives the index image file and sends the index image file to the display 405. The index image file comprises one or more menu items for remotely controlling the electronic apparatus 101. Each of the one or more menu items is a separate image within the index image file and may include, for example:

a) Menu item 1—Real-time viewing
    b) Menu item 2—Data viewing

The controls 403 on the remote wireless-enabled apparatus 105 are used to select 507 one of the menu items, and upon which the processor 401 instructs the wireless module 407 to inform the central processor 201 of the memory card 103 (through its wireless module 207) of the selected menu item. As each menu item in the index image file has a unique image identifier, the processor 201 of the memory card 103 recognises 509 the selected menu item 1 to control the electronic apparatus 101 in accordance with the associated instruction.

a) Menu Item 1—Real-Time Viewing

If menu item 1 is selected 511, the central processor 201 of the memory card 103 requests from the inbuilt processor 301 of the electronic apparatus 101 a real-time view of the image sensor 305, and wirelessly transmits the received real-time view onward to the remote wireless-enabled apparatus 105 through the respective wireless modules 207, 407. The processor 401 of the remote wireless-enabled apparatus 105 subsequently receives the real-time view of the image sensor 305 and directs the real-time view onward to the display 405.

Optionally, the controls 403 on the remote wireless-enabled apparatus 105 may also be used to control the position of the image sensor 305 in three-dimensional space (and, accordingly, the real-time view displayed on the remote wireless-enabled apparatus 105), provided the image sensor 305 of the electronic apparatus 101 has a built-in mechanism for moving in different axes.

In addition, the central processor 201 wirelessly sends a second index image file through the wireless modules 207, 407 to the remote wireless-enabled apparatus 105 for display. The second index image file comprises one or more sub-menu items for remotely controlling the electronic apparatus 101, which is superimposed on the real-time view displayed on the remote wireless-enabled apparatus 105. Each of the one or more sub-menu items is a separate image within the index image file and may include, for example:

a) Sub-menu item 1—Capture image
    b) Sub-menu item 2—Record video

Again, the controls 403 on the remote wireless-enabled apparatus 105 are used to select 513 the desired sub-menu item, and upon which the processor 401 instructs the wireless module 407 to inform the central processor 201 of the memory card 103 through its wireless module 207 of the selected menu item. As each sub-menu item in the index image file has a unique image identifier, the processor 201 of the memory card 103 again recognises 515 the selected sub-menu item to control the electronic apparatus 101 in accordance with the selected sub-menu item.

If sub-menu item 1 is selected 517, the instruction is immediately conveyed to the central processor 201 of the memory card 103 through the processor 401 of the remote wireless-enabled apparatus 105 and the respective wireless modules 207, 407. Accordingly, the central processor 201 proceeds to instruct the image sensor 305 of the electronic apparatus 101 to capture an image. While there may be a slight time delay between the selection of the sub-menu item 1 and the capture of the image, the time delay should not be significant.

Advantageously, a user who wants to take a picture of himself or a picture of his group of friends could conveniently do so via the controls 403 on the remote wireless-enabled apparatus 105, without having to ask a third party to operate the electronic apparatus 101 on his behalf or to rely on the time-delay function if available. Moreover, the user could also ensure that the picture is reasonably well-taken, since he is able to view the real-time view on the display 405 of the remote wireless-enabled apparatus 105 at the time of taking the picture.

After the image is captured and stored in the storage module 203 of the memory card 103, the central processor 201 then wirelessly sends a third index image file through the wireless modules 207, 407 to the remote wireless-enabled apparatus 105 for display. Like the previous index image files, the third index image file also comprises one or more sub-menu item. Each of the one or more sub-menu items is a separate image within the index image file and may include, for example:

a) Sub-menu item 1A—Input image name
b) Sub-menu item 1B—Add text on image
c) Sub-menu item 1C—Add position data
d) Sub-menu item 1D—Exit Again, the controls 403 on the remote wireless-enabled apparatus 105 are used to select 601 the desired sub-menu item, and upon which the processor 401 instructs the wireless module 407 to inform the central processor 201 of the memory card 103 through its wireless module 207 of the selected menu item. As each sub-menu item in the index image file has a unique image identifier, the processor 201 of the memory card 103 again recognises 603 the selected sub-menu item to control the electronic apparatus 101 in accordance with the selected sub-menu item.

If sub-menu item 1A is selected 605 via the controls 403 of the remote wireless-enabled apparatus 105, a name for the captured image could be entered via alphanumerical controls 403 on the remote wireless-enabled apparatus 105 and wirelessly sent to the central processor 201 of the memory card 103. It can be appreciated that this is done via the processor 401 of the remote wireless-enabled apparatus 105 and the respective wireless modules 207, 407.

By entering the names of images as soon as they have been taken, the user can more easily provide suitable names based on the settings of the images such as the relevant date, time and place, instead of having to recall those settings at a later stage.

If sub-menu item 1B is selected 607, text data could again be entered via the alphanumerical controls 403 of the remote wireless-enabled apparatus 105 and wirelessly sent to the memory card 103 to create the same text data on the captured image.

By adding relevant text data on the images, the user may advantageously ensure that he recalls memorable events associated with the images whenever he revisits those images at a later stage.

If sub-menu item 1C is selected 609, and provided the remote wireless-enabled apparatus 105 is a telecommunications-enabled device such as a mobile telephone or a GPS navigation system, position data such as GPS data are wirelessly sent to the memory card 103. Optionally, a personal computer receiving these images from the memory card 103 may have the relevant software to process the GPS data accordingly to provide the location of the captured images. This may be combined with, for example, a system such as Google Maps to give titles relative to the location. In this way it may give a title (e.g. The Louvre) rather than co-ordinates.

If sub-menu item 1D is selected 611, the communications between the remote wireless-enabled apparatus 105 and the memory card 103 is discontinued, and the remote wireless-enabled apparatus 105 accordingly resumes its original function.

If sub-menu item 2 ('Record video') is selected 519, the instruction is likewise conveyed immediately to the central processor 201 of the memory card 103 through the processor 401 of the remote wireless-enabled apparatus 105 and the respective wireless modules 207, 407. Accordingly, the central processor 201 proceeds to instruct the image sensor 305 of the electronic apparatus 101 to record the video as seen real-time on the display 405 of the remote wireless-enabled apparatus 105. Other functions of the memory card 103 just described above such as text and/or position data input also apply to the corresponding steps 602, 604, 606, 608, 610, 611 in the event the sub-menu item 2 is selected 519.

b) Menu Item 2—Data Viewing

If menu item 2 is selected 502, the central processor 201 of the memory card 103 wireless transmits thumbnail versions-of the images stored in the storage module 203 to the remote wireless-enabled apparatus 105 for display.

When a certain thumbnail is selected 504 via the controls 403 on the remote wireless-enabled apparatus 105, the central processor 201 of the memory card 103 is accordingly informed through the processor 401 of the remote wireless-enabled apparatus 105 and the respective wireless modules 207, 407. The central processor 201 then wirelessly sends 506 a second index image file to the remote wireless-enabled apparatus 105 for display. The second index image file comprises one or more sub-menu items for remotely controlling the memory card 103. Each of the one or more sub-menu items is a separate image within the second index image file and may include, for example:

a) Sub-menu item 1—Direct wireless transfer
b) Sub-menu item 2—Indirect wireless transfer Again, the controls 403 on the remote wireless-enabled apparatus 105 are used to select 508 the desired sub-menu item, and upon which the processor 401 instructs the wireless module 407 to inform the central processor 201 of the memory card 103 through its wireless module 207 of the selected menu item. As each sub-menu item in the index image file has a unique image identifier, the processor 201 of the memory card 103 again recognises 510 the selected sub-menu item to control the electronic apparatus 101 in accordance with the selected sub-menu item.

If sub-menu item 1 is selected 512 using the controls 403 on the remote wireless-enabled apparatus 105, the central processor 201 of the memory card 105 accordingly instructs the wireless module 207 to scan for nearby remote electronic apparatus with memory cards identical or similar to the memory card 103. If one or more such remote electronic apparatus are detected 701, the central processor 201 then gathers 703 the respective identifiers of the memory cards in the detected remote electronic apparatus. The central processor 201 subsequently sends these identifiers wirelessly to the remote wireless-enabled apparatus 105 for display. Each of these detected identifiers should be unique for recognition 705. By choosing the identifier of a particular memory card via the controls 403 on the remote wireless-enabled apparatus 105, the user can thus remotely control the memory card 103 to wirelessly transfer 707 the image—corresponding to the selected thumbnail on the remote wireless-enabled apparatus 105—directly to the remote electronic apparatus with the chosen memory card.

The communications between the remote wireless-enabled apparatus 105 and the memory card 103 is then discontinued 709, and the remote wireless-enabled apparatus 105 accordingly resumes its original function.

Optionally, the remote wireless-enabled apparatus 105 may be used for inputting a suitable identifier for a nearby memory card 103 that is being used in an electronic apparatus 101. Again, the identifier can be entered using the alphanumerical controls 403 of the remote wireless-enabled apparatus 105 and wirelessly sent to the central processor 201 of that nearby memory card 103 through the processor 401 and the respective wireless modules 207, 407.

By selecting 702 sub-menu item 2 using the controls 403 of the remote wireless-enabled apparatus 105, the remote wireless-enabled apparatus 105 can alternatively control the central processor 201 of the memory card 103 to instruct the wireless module 207 to detect for availability of an access point. Upon detection of an available access point, the wireless module 207 then establishes communications with that access point.

If more than one available access points are detected 704, the central processor 201 again gathers the respective identities (SSIDs) of the available access points and sends these identities (SSIDs) wirelessly to the remote wireless-enabled apparatus 105 for display. Again, each of these detected IDs of the available access points has its own unique identifier for recognition 706. By choosing a particular access point SSID via the controls 403 of the remote wireless-enabled apparatus 105, the user can thus remotely control the memory card 103 to instruct the wireless module 207 to establish communications with that chosen access point.

Once the communications between the wireless module 207 and the chosen access point have been established, the image—corresponding to the thumbnail selected on the remote wireless-enabled apparatus 105—is wirelessly sent 708 from the memory card 103 to one or more predetermined websites or servers. The entry of the one or more predetermined websites or servers is typically done by operatively connecting the memory card 103 to a computer, and using the computer to enter the relevant details of the website(s) or server(s). Alternatively, the remote wireless-enabled apparatus 105 may also be used to enter the relevant details of the predetermined website(s) or server(s) using the controls 403 and sending the inputted details wirelessly to the central processor of the memory card 103.

Optionally, the central processor 201 may automatically detect for availability of an access point in the absence of a nearby remote electronic apparatus for a direct wireless transfer of a selected image from the memory card 103.

Upon completion of the image transfer from the memory card 103 to either a remote electronic apparatus or a predetermined website/server, the central processor 201 of the memory card 103 sends a confirmation signal through the respective wireless modules 207, 407 to the processor 401 of the remote wireless-enabled apparatus 105. The processor 401 then indicates the status of the image transfer to the user local at the remote wireless-enabled apparatus 105 through the display 405 or through any other available means such as a vibrator or a speaker.

The communications between the remote wireless-enabled apparatus 105 and the memory card 103 is then discontinued 709, and the remote wireless-enabled apparatus 105 accordingly resumes its original function.

Other embodiments can be envisaged without departing from the scope or spirit of this invention. For example, the various index image files each of which comprises the plurality of menu and sub-menu items may be stored in the remote wireless-enabled apparatus 105. In this way, the central processor 201 of the memory card 103 is not required to send those various index image files wirelessly to the remote wireless-enabled apparatus 105. The electronic apparatus 101 may also have an audio sensor for recording real-time audio data, instead of the image sensor 305 for recording real-time image and/or video data. In addition, the remote wireless-enabled apparatus 105 may also be used to power on and power off the electronic apparatus 101 based on the principles described above.

The invention claimed is:

1. A memory card for use in a digital camera, the digital camera having an inbuilt processor incapable of exporting digital data externally of the digital camera, the memory card comprising:
   a wireless module; and
      a central processor configured to control the inbuilt processor of the digital camera, in accordance with an instruction wirelessly received through the wireless module from a remote wireless-enabled apparatus;
   wherein the central processor is configured to wirelessly send a first index image file through the wireless module to the remote wireless-enabled apparatus for display, the index image file comprising a plurality of menu items, wherein each of the plurality of menu items is a separate image within the index image file,
   wherein the plurality of menu items includes at least (i) a real-time viewing menu item and (ii) a data viewing menu item, whereby a user of the remote wireless-enabled apparatus can either view, either:
      (a) a real-time image captured by an image sensor of the digital camera, or
      (b) any image stored on the digital camera, on the remote wireless-enabled apparatus,
      and wherein, upon selection by a user of one of the plurality of menu items by selecting the corresponding image, the central processor is configured to wirelessly send a second image index file comprising one or more sub-menu items which may be selected by a user to perform a function on the digital camera, each sub-menu item being a separate image within the second index image file, and having a unique image identifier which is recognized by the processor in the memory card and used to control the digital camera upon selection by the user of the corresponding image from the second image index file.

2. The memory card of claim 1, wherein the central processor is configured to request from the inbuilt processor of the digital camera a real-time view of an image sensor, and to wirelessly transmit the real-time view onward to the remote wireless-enabled apparatus through the wireless module.

3. The memory card of claim 2, wherein the central processor is configured to instruct the image sensor, via the inbuilt processor of the digital camera, to move in three-dimensional space.

4. The memory card of claim 2, wherein the central processor is configured to control the image sensor, via the inbuilt processor of the digital camera.

5. The memory card of claim 4, wherein the central processor is configured to wirelessly receive position and/or text data from the remote wireless-enabled apparatus through the wireless module, the position and/or text data being associated with the image captured by the image sensor.

6. The memory card of claim 1, wherein the central processor is configured to wirelessly transmit thumbnail versions of images stored in the memory card through the wireless module to the remote wireless-enabled apparatus for display.

7. The memory card of claim 6, wherein the central processor is configured to wirelessly transmit an image from the memory card directly to a remote digital camera through the wireless module, upon a corresponding thumbnail version of the image displayed on the remote wireless-enabled apparatus being selected.

8. The memory card of claim 7, wherein the central processor is configured, upon completion of the image transfer from the memory card to the remote digital camera or the predetermined website or server, to send a confirmation signal to the remote wireless-enabled apparatus.

9. The memory card of claim 6, wherein the central processor is configured to detect for availability of an access point, and upon detection of an available access point to establish communications between the wireless module and the access point.

10. The memory card of claim 9, wherein the central processor is configured to automatically detect for availability of an access point in the absence of a remote digital camera for direct wireless transmission of the image from the memory card.

11. The memory card of claim 9, wherein upon detection of a plurality of available access points, the central processor is configured to wirelessly transmit associated IDs of the plurality of available access points through the wireless module to the remote wireless-enabled apparatus for display.

12. The memory card of claim 11, wherein the central processor is configured to instruct the wireless module to establish communications with one of the plurality of available access points, upon a corresponding identity of that access point displayed on the remote wireless-enabled apparatus being selected.

13. The memory card of claim 9, wherein the central processor is configured, upon the communications between the wireless module and the access point being established, to wirelessly transmit an image from the memory card through the wireless module and that access point to a predetermined website or server, the image corresponding to a selected thumbnail image displayed on the remote wireless-enabled apparatus.

14. The memory card of claim 1, wherein upon one of the plurality of menu items displayed on the remote wireless-enabled apparatus being selected, the central processor is configured to perform a function selected from a group consisting of:
    to request from the inbuilt processor of the digital camera a real-time view of the image sensor, and to wirelessly transmit the real-time view onward to the remote wireless-enabled apparatus through the wireless module; and
    to wirelessly transmit thumbnail versions of images stored in the memory card through the wireless module to the remote wireless-enabled apparatus for display.

15. A wireless-enabled apparatus for controlling a remote digital camera having the memory card of claim 1 and an inbuilt processor that is incapable of independently exporting digital data externally of the remote digital camera, the wireless-enabled apparatus being configured to wirelessly send an instruction to the remote digital camera so as to control the remote digital camera in accordance with the instruction.

16. The wireless-enabled apparatus of claim 15, wherein the wireless-enabled apparatus is a telecommunications-enabled apparatus and/or a navigation system.

17. A method of controlling a digital camera, the digital camera having the memory card of claim 1 and an inbuilt processor incapable of independently exporting digital data externally of the digital camera, the method comprising:
    the memory card wirelessly receiving an instruction through the wireless module from the remote wireless enabled apparatus, and
    the memory card controlling the digital camera in accordance with the received instruction.

18. The method of claim 17, wherein the memory card controlling the digital camera comprises the central processor of the memory card requesting from the inbuilt processor of the digital camera a real-time view of an image sensor, and wirelessly transmitting the real-time view onward through the wireless module to the remote wireless-enabled apparatus for display.

19. The method of claim 18, wherein the central processor controlling the inbuilt processor comprises the central processor instructing the image sensor to move in three-dimensional space.

20. The method of claim 18, wherein the central processor controlling the inbuilt processor comprises the central processor instructing the image sensor to capture an image for storing in the memory card.

21. The method of claim 20, further comprising at least one selected from the group consisting of:
    the memory card wirelessly receiving position data from the remote wireless-enabled apparatus, the position data being associated with the image captured by the digital camera; and
    the memory card wirelessly receiving text data from the remote wireless-enabled apparatus, the text data being associated with the image captured by the digital camera.

22. The method of claim 17, further comprising at least one selected from the group consisting of:
    the memory card wirelessly transmitting thumbnail versions of images stored in the memory card to the remote wireless-enabled apparatus for display;
    the memory card wirelessly transmitting an image from the memory card directly to a remote digital camera, upon a corresponding thumbnail version of the image displayed on the remote wireless-enabled apparatus being selected; and
    The memory card detecting for availability of an access point and establishing communications between the wireless module and the access point, upon detection of an available access point.

23. The method of claim 22, wherein the step of the memory card detecting for the availability of the access point is automatic, in the absence of the remote digital camera for direct wireless transmission of the image from the memory card.

24. The method of claim 22, further comprising at least one selected from the group consisting of:
    the memory card wirelessly transmitting associated IDs of a plurality of available access points to the remote wireless-enabled apparatus through the wireless module for display on the screen of the remote wireless-enabled apparatus, upon the detection of the plurality of available access points;

the memory card establishing communications with one of the plurality of available access points, upon a corresponding identity of that access point displayed on the remote wireless-enabled apparatus being selected;

the memory card wirelessly transmitting an image from the memory card through the wireless module and that access point to a predetermined website or server, upon the communications between the wireless module and the access point being established, the image corresponding to a selected thumbnail image displayed on the screen of the remote wireless-enabled apparatus;

the memory card sending a confirmation signal to the remote wireless-enabled apparatus, upon completion of the image transfer from the memory card to the remote digital camera or to the predetermined website or server; and the memory card sending an index image file to the remote wireless-enabled apparatus for display, the index image file comprising a plurality of menu items.

25. The method of claim 24, wherein upon one of the plurality of menu items displayed on the screen of the remote wireless-enabled apparatus being selected, the method further comprising at least one selected from the group consisting of:

the central processor of the memory card requesting from the inbuilt processor of the digital camera a real-time view of the image sensor, and wirelessly transmitting the real-time view onward through the wireless module to the remote wireless-enabled apparatus for display; and the central processer of the memory card wirelessly transmitting thumbnail versions of images stored in the memory card through the wireless module to the remote wireless-enabled apparatus through the wireless module for display.

* * * * *